US011243891B2

(12) United States Patent
Raval et al.

(10) Patent No.: US 11,243,891 B2
(45) Date of Patent: Feb. 8, 2022

(54) EXTERNAL MEMORY BASED TRANSLATION LOOKASIDE BUFFER

(71) Applicant: ATI Technologies ULC, Markham (CA)

(72) Inventors: Nippon Harshadk Raval, Markham (CA); Philip Ng, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/141,603

(22) Filed: Sep. 25, 2018

(65) Prior Publication Data

US 2020/0097413 A1 Mar. 26, 2020

(51) Int. Cl.
*G06F 12/00* (2006.01)
*G06F 12/1045* (2016.01)

(52) U.S. Cl.
CPC ...... *G06F 12/1045* (2013.01); *G06F 2212/68* (2013.01)

(58) Field of Classification Search
CPC ... G06F 12/1045; G06F 12/10; G06F 2212/68
See application file for complete search history.

(56) References Cited

U.S. PATENT DOCUMENTS

| | | | | |
|---|---|---|---|---|
| 8,893,267 B1* | 11/2014 | Sathe | ...... | G06F 21/31 711/153 |
| 9,710,394 B2* | 7/2017 | Guthrie | ...... | G06F 12/0815 |
| 2002/0062425 A1* | 5/2002 | Chauvel | ...... | G06F 12/0891 711/130 |
| 2002/0169938 A1* | 11/2002 | Scott | ...... | G06F 12/1072 711/207 |
| 2006/0224815 A1 | 10/2006 | Yamada et al. | | |
| 2010/0313201 A1* | 12/2010 | Warton | ...... | G06F 12/1027 718/1 |
| 2013/0031332 A1* | 1/2013 | Bryant | ...... | G06F 12/084 711/207 |

(Continued)

OTHER PUBLICATIONS

Farrens, Matthew et. al.; "A Partitioned Translation Lookaside Buffer Approach to Reducing Address Bandwith;" May 1992; available at https://dialog.proquest.com/professional/inspec/docview/826343731/16D1277569318311F49/1?accountid=142257.*

(Continued)

*Primary Examiner* — Prasith Thammavong
*Assistant Examiner* — Richard L Sutton
(74) *Attorney, Agent, or Firm* — Volpe Koenig (57) ABSTRACT

Methods, devices, and systems for virtual address translation. A memory management unit (MMU) receives a request to translate a virtual memory address to a physical memory address and searching a translation lookaside buffer (TLB) for a translation to the physical memory address based on the virtual memory address. If the translation is not found in the TLB, the MMU searches an external memory translation lookaside buffer (EMTLB) for the physical memory address and performs a page table walk, using a page table walker (PTW), to retrieve the translation. If the translation is found in the EMTLB, the MMU aborts the page table walk and returns the physical memory address. If the translation is not found in the TLB and not found in the EMTLB, the MMU returns the physical memory address based on the page table walk.

32 Claims, 6 Drawing Sheets

(56) References Cited

U.S. PATENT DOCUMENTS

| | | | | |
|---|---|---|---|---|
| 2014/0052917 A1* | 2/2014 | Koka | ............... | G06F 12/1027 |
| | | | | 711/120 |
| 2015/0095610 A1* | 4/2015 | Ben-Meir | ........... | G06F 12/1036 |
| | | | | 711/207 |
| 2015/0199280 A1* | 7/2015 | Molnar | ............... | G06F 12/1027 |
| | | | | 711/207 |
| 2016/0103768 A1* | 4/2016 | Jiang | ................ | G06F 12/1027 |
| | | | | 711/159 |
| 2016/0140040 A1* | 5/2016 | Mukherjee | .......... | G06F 12/1027 |
| | | | | 711/135 |
| 2016/0246731 A1* | 8/2016 | Koob | .................... | G06F 11/079 |
| 2017/0371799 A1* | 12/2017 | Mukherjee | .......... | G06F 12/0842 |
| 2018/0067866 A1* | 3/2018 | Shanbhogue | ....... | G06F 9/45558 |
| 2018/0150406 A1* | 5/2018 | John | .................... | G06F 12/0802 |
| 2018/0246816 A1 | 8/2018 | Smith et al. | | |

OTHER PUBLICATIONS

MIPS Technology, Inc.; "Address Space Identification (ASID);" Dec. 9, 1996; Section 16.3 Virtual Address Translation; Available at: https://techpubs.jurassic.nl/manuals/hdwr/developer/R10K_UM/sgi_html/t5.Ver.2.0.book_341.html.*

Zibiciak, Joe; "How does the TLB know which data to evict from its cache?;" Feb. 23, 2017; available at https://www.quora.com/How-does-the-TLB-know-which-data-to-evict-from-its-cache.*

Zibiciak; "How does the TLB know which data to evict from its cache?;" Feb. 23, 2017; available at: https://www.Quora.com/How-does-the-TLB-know-which-data-to-evict-from-its-cache (Year: 2017).*

* cited by examiner

EXTERNAL MEMORY BASED TRANSLATION LOOKASIDE BUFFER

BACKGROUND

Modern microprocessors typically abstract physical addresses in main memory to virtual memory addresses that are used by programs. Translation between virtual memory addresses and physical memory addresses is performed by hardware on the processor, typically referred to as a memory management unit (MMU). Correspondence between virtual memory addresses and physical memory addresses is maintained in page tables. The MMU can retrieve a translation between a virtual memory address and a physical memory address by performing a lookup in the page tables. A lookup in a page table is typically referred to as a page table walk, and is performed by hardware of the MMU, typically referred to as a page table walker (PTW).

Resolving a physical memory address using a page table walk can be time intensive. In order to speed up memory access by reducing translation times, recent translations between virtual memory addresses and physical memory addresses are typically cached in a memory of the MMU, referred to as a translation lookaside buffer (TLB). The TLB is typically a part of the MMU.

BRIEF DESCRIPTION OF THE DRAWINGS

A more detailed understanding can be had from the following description, given by way of example in conjunction with the accompanying drawings wherein.

DETAILED DESCRIPTION

Some implementations include a method for virtual address translation which includes a memory management unit (MMU) receiving a request to translate a virtual memory address to a physical memory address; and searching a translation lookaside buffer (TLB), for a translation to the physical memory address based on the virtual memory address. If the translation is not found in the TLB, an external memory translation lookaside buffer (EMTLB) is searched for the translation and a page table walker (PTW) performs a page table walk to retrieve the translation from a page table. If the translation is found in the EMTLB, the page table walk is aborted and the physical memory address is returned. If the translation is not found in the EMTLB, the physical memory address is returned based on the page table walk.

Some implementations provide a MMU for virtual address translation. The MMU includes circuitry to receive a request to translate a virtual memory address to a physical memory address; circuitry to search, based on the virtual memory address, a TLB, for a translation to the physical memory address; circuitry to search an EMTLB for the translation and to perform a page table walk using a PTW to retrieve the translation, if the translation is not found in the TLB; circuitry to abort the page table walk and return the physical memory address if the physical memory address is found in the EMTLB; and circuitry to return the physical memory address based on the page table walk if the translation is not found in the EMTLB.

Some implementations provide a computing device that includes a processor and a memory in communication with the processor. The processor includes a MMU for virtual address translation. The MMU includes a TLB and a PTW and the memory includes an EMTLB. The MMU also includes circuitry to receive a request to translate a virtual memory address to a physical memory address. The MMU also includes circuitry to search the TLB based on the virtual memory address for a translation to the physical memory address. The MMU also includes circuitry to search the EMTLB for the translation and to perform a page table walk using the PTW to retrieve the translation, if the translation is not found in the TLB. The MMU also includes circuitry to abort the page table walk and return the physical memory address if the translation is found in the EMTLB. The MMU also includes circuitry to return the physical memory address based on the page table walk if the translation is not found in the TLB and not found in the EMTLB.

Figure 1:
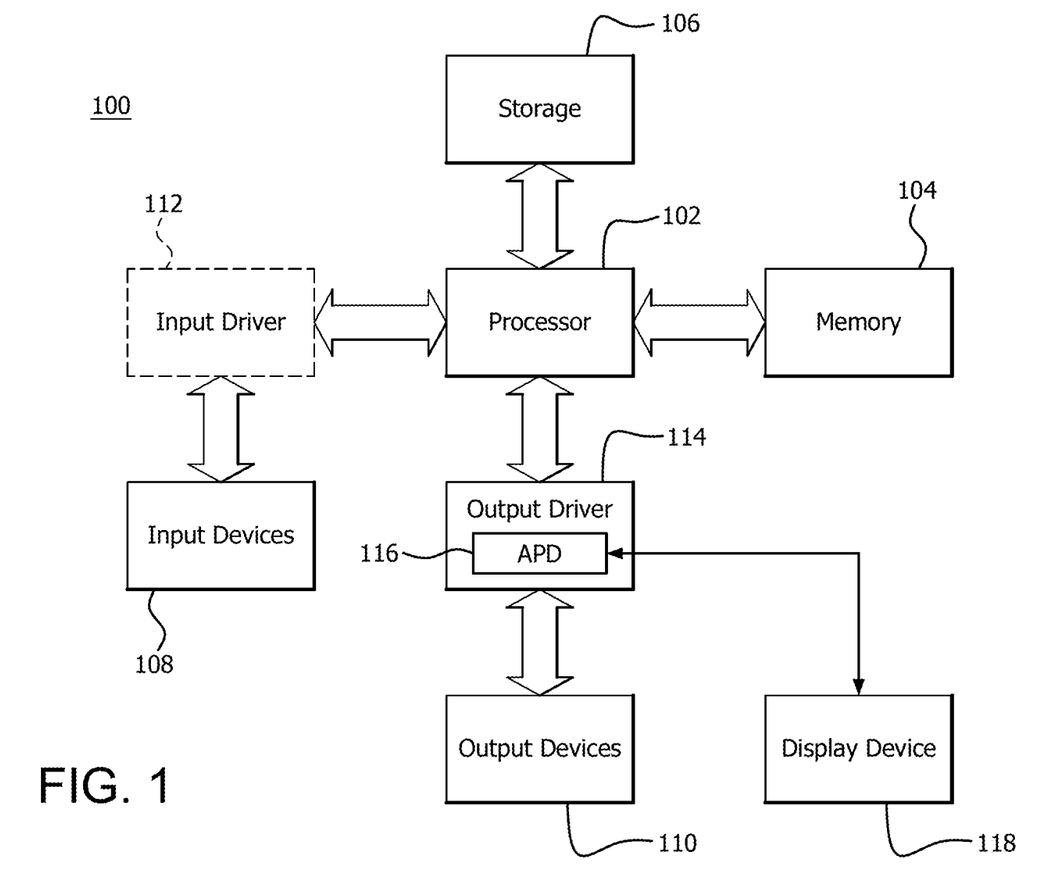
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units that perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provide graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm perform the functionality described herein.

Figure 2:
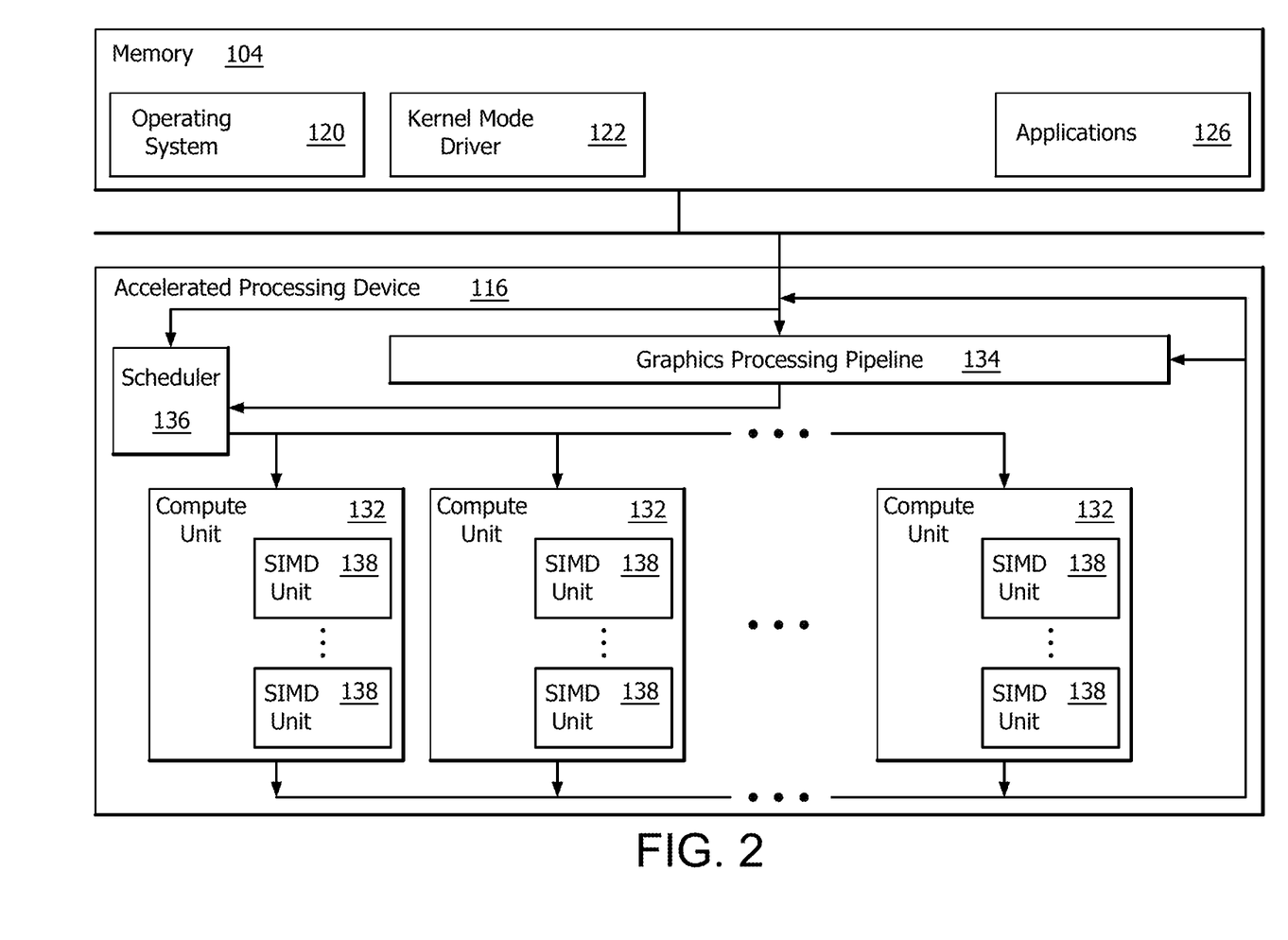
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Processor 102 includes a MMU and TLB to translate between virtual memory addresses and physical memory addresses (e.g., in memory 104). It is noted that in some implementations, multiple components within processor 102 each contain an MMU and TLB. In some example implementations of device 100, processor 102 contains an MMU within each of several x86 CPU cores, an MMU within APD 116 (e.g., a GPU), and an I/O MMU to support I/O devices such as a network controller.

As computer systems have evolved they have typically included larger and larger physical memory stores, and programs for these systems typically leverage larger and larger amounts of this memory, often with lower reference locality. Lower reference locality refers to access of a particular memory location at a more distant time (temporal) or accessing different memory locations at more distant locations in storage (e.g., on a physical medium, or based on the organizational structure of the storage). Large memory spaces and lower reference locality can contribute to high or otherwise undesirable TLB miss rates, and consequently, higher virtual-to-physical address translation overhead. Typically this is because increased TLB miss rates require an increased number of page table walks to retrieve virtual-to-physical translations that are not cached in the TLB. Resolving a translation using page table walks yields significantly lower performance (i.e., takes significantly longer) than retrieving a cached translation from the TLB.

From a conceptual point of view, increasing the size of the TLB could result in improved address translation overhead. However, the required increase in on-chip hardware of a typical TLB implemented in an MMU of a processor would be impractical in terms of die area and/or expense. Changing the page size, and thus the unit of translation, could also result in improved address translation overhead without increasing the size of the TLB in some implementations. For example, x86 processors support pages of 4 KB, 2 MB and 1 GB. Software controls the page sizes however, and by default often uses the smallest size. Accordingly, operating system (OS) enhancements or application recompilation are required to access new OS interfaces for requesting larger pages in some implementations. Use of larger pages also impacts memory efficiency, as large regions of memory are moved, for example, when paging memory out to disk. Use of larger pages also reduces memory efficiency in some cases where not all of the memory within the larger sized page is used within the active working set of the application. Further, a larger page size creates a minimum granularity for allocating memory, which causes small applications to use memory inefficiently in some cases. Further, software compatibility can constrain the use of larger pages in some implementations. For example, if the page table is interpreted by an x86 processor, the format is fixed in order to maintain compatibility with existing operating system software. This also fixes the pages sizes supported in some implementations. As a result, it is not possible to change the radix of the page table tree and/or change the basic page sizes without breaking general compatibility in some cases.

It is desired to provide improved address translation when the working set exceeds on-chip TLB capacity without requiring changes to the page table structure in memory and such that operating systems are able to continue to utilize existing page table formats and memory allocation algorithms. Accordingly, an external memory translation lookaside buffer (EMTLB) is described herein which caches virtual-to-physical address translations that have been evicted from an on-chip TLB to an external memory.

Figure 3:
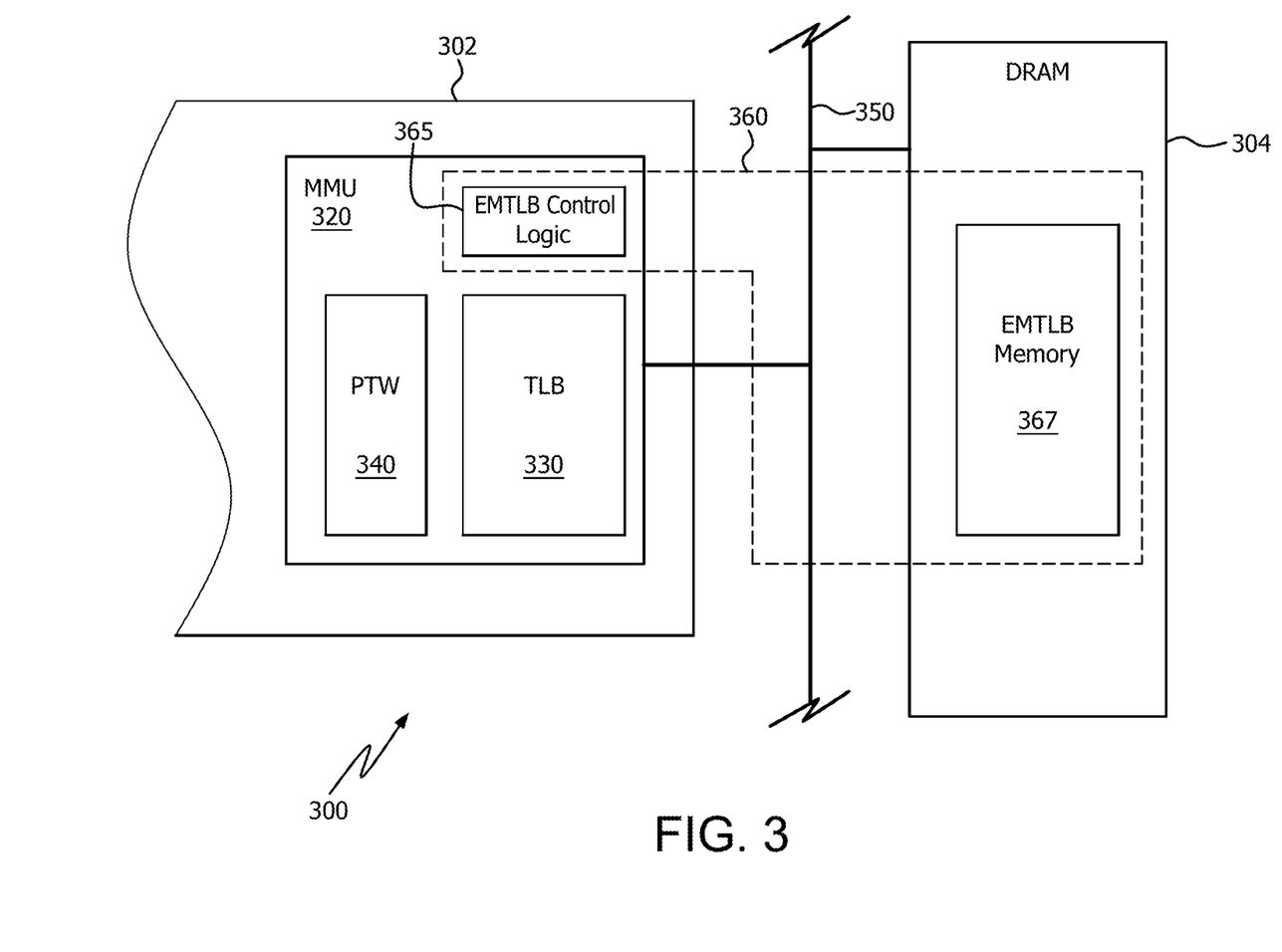
FIG. 3 is a block diagram illustrating an example system including an external memory translation lookaside buffer (EMTLB), usable with the device of FIGS. 1 and 2, according to an example.

FIG. 3 is a block diagram illustrating an example system 300 including an example EMTLB 360. System 300 includes a processor 302 and memory 304. Processor 302 is in communication with memory 304 over a communications medium 350. EMTLB 360 includes an EMTLB memory 367 stored within memory 304, and EMTLB control logic 365 implemented on MMU 320. Communications medium 350 can include any suitable computer interconnect or combination of computer interconnects, such as a memory bus.

In some examples, system 300 is implemented using device 100 as shown and described with respect to FIGS. 1 and 2. For example, in such implementations, processor 302 is implemented as processor 102, and memory 304 is implemented as memory 104. In other examples, other suitable processor, memory, and other components are used.

Processor 302 includes MMU 320. MMU 320 includes TLB 330 and PTW 340. MMU 320 may be implemented fully in hardware on processor 302, may be implemented in firmware running on an embedded processor internal to processor 302, or in any other suitable way. MMU 320 includes control logic for managing TLB 330 and EMTLB control logic 365 for managing EMTLB memory 367. EMTLB memory 367 is a raw memory storage within DRAM 304. A limited set of operations (e.g., read and write) are implemented between EMTLB control logic 365 and EMTLB memory 367. In some implementations however, EMTLB 360 supports more complex operations (e.g., atomic operations). Memory 304 is the main memory, or a portion of the main memory, of system 300, and includes any suitable non-transitory computer readable medium, such as a dynamic random access memory (DRAM).

MMU 320 receives translation requests that include, or refer to, a virtual address. In some examples, MMU 320 receives the translation requests from a client. The client can include any suitable entity within processor 302, such as a compute unit (CU), display engine, video decoder, GPU command processor, or the like. In some examples, MMU 320 receives the translation requests from an integrated or external input/output (TO) device, such as an integrated universal serial bus (USB) controller, external PCIe attached network controller, or the like. In response, MMU 320 returns a physical address corresponding to the virtual address to the entity having made the request. The physical address refers to a physical memory address within memory 304, and is obtained using one of various procedures such as those described herein. In this example, if MMU 320 receives a translation request indicating a virtual memory address, it checks TLB 330 to see if a translation has been cached therein (i.e., a TLB hit). If not (i.e., a TLB miss), the MMU 320 checks EMTLB 360 to see if a translation has been cached therein, and/or performs a page table walk using PTW 340, as further described herein.

In some examples, prior to performing a page table walk, TLB 330 is accessed to try to obtain a partial translation. In this context, a partial translation provides information enabling a page table walk to be started from an intermediate level of the page table radix tree rather than the root. Obtaining a partial translation in this way can have the advantage of reducing the number of memory accesses required by the page table walk. In some implementations, the reduction in memory accesses is enabled by using the partial translation to begin the page table walk part way down the radix tree of the page table. If the partial translation also misses, the page table walk is performed as a full page table walk from the root of the page table.

In some implementations, if the page table walk completes prior to completion of a concurrent EMTLB lookup (e.g., by using a partial translation to reduce the time needed to perform the page table walk), the EMTLB lookup is aborted. In some cases, the EMTLB lookup is aborted after the TLB lookup completes. In some cases, the EMTLB lookup is aborted preemptively based on a prediction of the number of memory accesses required to perform the page table walk based on a partial translation result from the TLB lookup. In some such cases, the number of future memory requests to be performed by the page table walk is not precisely known. A partial translation result obtained from the TLB does not directly indicate the number of additional memory accesses required to complete the page table walk; e.g., due to different page sizes (and thus levels in the page table), potential other TLB structures, and so forth. Accordingly, in order to predictively abort a concurrent EMTLB lookup based on a partial translation, a heuristic or prediction scheme is implemented in some cases where the number of memory accesses required for the page table walk is unknown.

TLB 330 is a specialized cache memory that caches recent virtual to physical (or vice versa) memory address translations made by the MMU. TLB 330 includes an on-chip memory to store TLB entries, and is implemented on processor 302 as a part of MMU 320. In some implementations, TLB 330 is a multi-level cache. In some examples, TLB 330 includes an L1 TLB and an L2 TLB, where the L1 TLB is faster, but smaller than the L2 TLB. Because the L1 TLB is faster, translations that are used frequently are performed more quickly on a L1 TLB hit. However because the L1 TLB is smaller, translations that are not used as frequently are evicted from the L1 TLB and stored in the L2 TLB. Because the L2 TLB is larger than the L1 TLB, a greater number of translations are stored therein to provide a greater chance for a L2 TLB hit (avoiding resort to the EMTLB 360 or PTW 340). However because the L2 TLB is slower than the L1 TLB, translation latency and accordingly overall memory access performance is somewhat lower than in cases of an L1 TLB hit. If both L1 TLB and L2 TLB miss, MMU 320 performs a page table walk using PTW 340 and/or performs an EMTLB lookup in EMTLB 360.

PTW 340 is specialized hardware that performs a page table walk in order to translate virtual addresses to physical addresses; e.g., in cases where such translation is not cached in TLB 330 or EMTLB 360. PTW 340 is implemented on processor 302 as a part of MMU 320. Page table walks are relatively time intensive and result in higher translation latency than either TLB or EMTLB hits. In some examples, this is because the page table walk requires multiple dependent and/or serial accesses to memory for a single translation.

There are several ways of constructing a page table. An example page table for use in x86, ARM, and other systems is constructed using a radix tree. A radix tree is an N-level tree structure where nodes at each level contain a number of pointers to nodes in the next level. In an example x86 page table with 48-bit virtual addresses, each node contains 512 pointers to nodes at the next level.

Another example page table uses a form of hash table. Using a hash table in this manner provides faster best-case lookups (e.g., requiring 1 memory access) in some implementations, but in some cases requires special handling of potential hash collisions, including fallback to software.

The hash table of EMTLB 360 is simpler than the full page table; e.g., in cases where special case handling for hash collisions is simplified or eliminated for the EMTLB 360. In such cases, for example, EMTLB 360 falls back to its full radix tree to obtain translations rather than relying on secondary searches or falling back to software to resolve a hash collision.

EMTLB 360 includes a region of memory 304 (EMTLB memory 367 in the figure) set aside to cache virtual-physical address translations that have been evicted from TLB 330, and functions as a lower level of the cache hierarchy that includes TLB 330. Because EMTLB memory 367 is located in memory 304 and is not a part of the on-chip TLB 330, an EMTLB hit in response to a lookup request will have higher translation latency than a TLB hit. The memory of EMTLB 360 is significantly larger than in TLB 330 however. Accordingly, a significantly greater number of translations are stored in EMTLB 360 as compared with TLB 330—in some cases, on the order of 1000 times greater. This is advantageous in that if TLB 330 misses in response to a translation request, an EMTLB hit will have lower translation latency than a page table walk, even if the translation latency is higher than a TLB hit.

In some implementations, EMTLB memory 367 is allocated in, or "carved out" of, memory 304 when system 300 is initialized or "booted". Memory is allocated for EMTLB 360 in any suitable way. For example, in some implementations, memory is reserved by a basic input/output system (BIOS) prior to loading a hypervisor and/or operating system (OS). In some implementations, the memory of EMTLB 360 is allocated by the hypervisor or OS. All entries of EMTLB 360 are initialized such that they do not contain valid translations. In some cases, EMTLB 360 supports multiple page sizes (e.g., 1 gigabyte, 2 megabyte, and 4 kilobyte sizes). In some cases, entries in EMTLB 360 include a tag and data portion. The tag portion includes a virtual address and can include a domain ID, page size, and/or process address space identifier (PASID) in some examples. The data portion includes a physical address and can include read/write/execute permissions, and/or a dirty bit in some examples.

EMTLB 360 can have any suitable structure. In some examples EMTLB 360 is set/way associative. In some examples, entries in EMTLB 360 are of arbitrary size; i.e., are not limited by the storage size of entries in the page table (e.g., 8 bytes in x86). In some examples, EMTLB 360 includes more entries than an on-chip TLB (e.g., TLB 330). In some examples, EMTLB 360 implements a replacement policy and maintains a replacement history; e.g., to allow eviction of the least recently used (LRU) entry. In some examples, EMTLB 360 maintains state for the replacement policy in off-chip memory (e.g., in DRAM 304).

In some examples, read-modify-write memory operations are executed by MMU 320 in order to perform the EMTLB lookup or to update the EMTLB 360, e.g., following an eviction from TLB 330.

In the examples herein, EMTLB lookups are controlled by EMTLB control logic 365, which is part of the MMU 320 in this example. It is noted however that in various implementations, the EMTLB memory 360 is maintained using control logic which can be implemented using special purpose hardware, using an embedded processor running dedicated firmware, using software running on a main processor (e.g., processor 302 or a core of processor 302), and/or in any other suitable way. In some such implementations, the EMTLB control logic 365 determines whether or not to cache the EMTLB memory 367.

In some implementations, more than one EMTLB control logic shares a common pool of EMTLB memory (e.g., EMTLB memory 367). In some such implementations, a scenario arises in some cases where a read and/or write access to a portion of the shared EMTLB memory 367 by one EMTLB control logic conflicts with a read and/or write access of another EMTLB control logic. In such cases, if EMTLB caching is not used, atomic operations are used to coordinate among multiple EMTLB controllers sharing a common pool of EMTLB memory in some examples. In some implementations, one EMTLB control logic (e.g., EMTLB control logic 365) reads, and then performs a compare-and-swap atomic operation to update the entry. Through these operations, it can be ascertained that either no other EMTLB control logic wrote to the entry after it was read (i.e., the compare against the previous value passes) or the compare-and-swap atomic operation failed and the EMTLB control logic 365 takes a corrective action (e.g., attempts to read-compare-and-swap again, or drops the entry). If EMTLB caching is used in these cases, such caching is coherent across all EMTLB controllers sharing the same EMTLB memory in some examples.

In some examples, software or firmware and the processor or controller executing the software or firmware uses specific operations to perform atomic read/modify/write operations, such as an x86 lock prefix instruction. In such cases, the EMTLB is modifiable using cache coherent operations from a processor rather than memory operations from non-coherent hardware. In some implementations, more than one EMTLB control logic each accesses separate EMTLB memory. In some implementations, no coordination is required in such cases.

In some examples, EMTLB 360 selects a way to which a new entry should be written, randomly (or pseudo-randomly), avoiding the need to maintain a replacement history for this purpose. In some examples, this random or pseudo-random selection is performed using a linear-feedback shift register (LFSR) to select the way. In some examples, writing entries to the EMTLB randomly, or pseudo-randomly makes maintaining a replacement history or state unnecessary.

In some examples, EMTLB 360 is direct mapped. In some such examples, the tag of the entry to be stored in EMTLB memory 367 is used to decide which entry of EMTLB 360 should be written. In some cases this yields a contention issue where similar tags hash to the same location, resulting in thrashing of EMTLB 360 to some extent. It is noted that in some cases thrashing also occurs in set-associative implementations of EMTLB 360; for example, if there are repeated requests to store N+1 translations that all map to the same index of an N-way associative cache/TLB structure.

Figure 4:
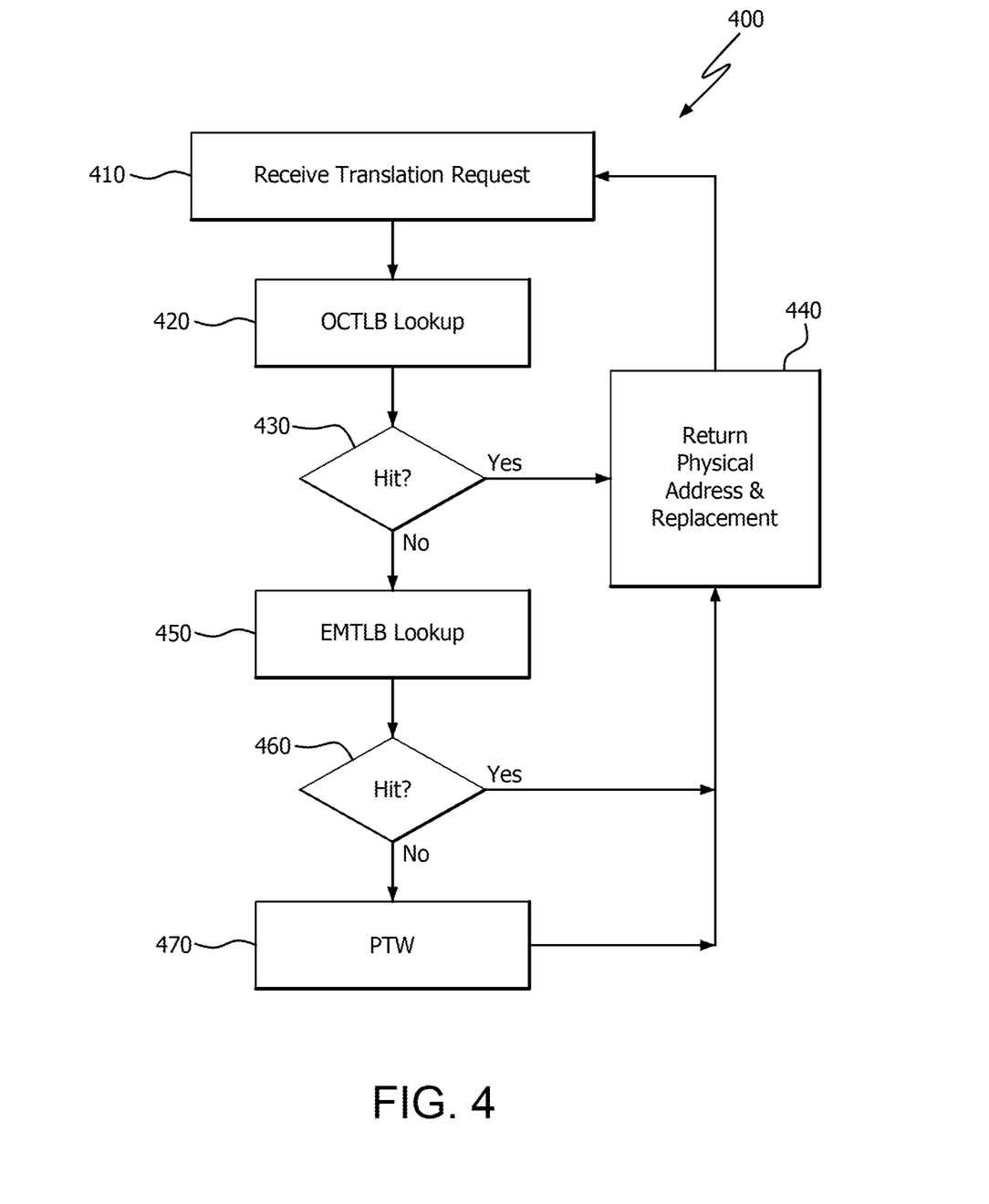
FIG. 4 is a flow diagram illustrating an example procedure for performing a virtual-to-physical address translation.

FIG. 4 is a flow diagram illustrating an example procedure 400 for performing a virtual-to-physical address translation. In some implementations, procedure 400 is usable with system 300 as shown and described with respect to FIG. 3.

In step 410, an MMU (e.g., MMU 320 as shown and described with respect to FIG. 3) receives a request to translate a virtual address from a client. The request includes (or indicates) a virtual address for translation to a physical address in memory.

The MMU performs a lookup in its TLB (e.g., TLB memory 330 as shown and described with respect to FIG. 3) in step 420. In some examples, the TLB memory is part of the MMU, or is in the same core or on the same chip as the MMU, etc. This is referred to as "on-chip TLB" or OCTLB in FIG. 4. In various implementations, this TLB includes one cache level, or more than one cache level.

On a condition 430 that the TLB lookup hits (i.e., a translation for the virtual address included in or indicated by the request is found in the MMU TLB), the corresponding physical address stored in the TLB is returned to the client in step 440. In some implementations, a replacement algorithm for the TLB is executed at this time to update the cache (e.g., in cases where the translation was found in a lower level of the MMU TLB). In some examples, the algorithm updates the replacement state of the TLB but does not alter the translation information.

On the condition 430 that the TLB lookup misses (i.e., a translation for the virtual address included in or indicated by the request is not found in the MMU TLB), the MMU performs a lookup in an EMTLB (e.g., EMTLB 360 as shown and described with respect to FIG. 3.) in step 450.

On a condition 460 that the EMTLB lookup hits, the corresponding physical address stored in the EMTLB is returned to the client in step 440. In some implementations, the replacement state of the EMTLB is updated to reflect the EMTLB lookup hit (i.e., to note that the physical address translation was the most recently used in the EMTLB).

In some implementations, the physical address translation is stored in the TLB at this stage. In some implementations, the replacement state of the TLB is updated to reflect the replacement state of the TLB based on having written the entry from the EMTLB memory to the TLB memory (e.g., to note that the physical address translation was the most recently used in the TLB). In some implementations, if the TLB is full before the physical address translation is stored, a replacement algorithm is also executed to identify an entry for eviction to make room for the physical address translation. In some implementations, if an entry is evicted from the TLB to make room for the physical address translation, the evicted entry is written to the EMTLB, and a corresponding replacement algorithm is run on the EMTLB if necessary (e.g., to determine which entry to evict from the EMTLB, if necessary, and to update the recency of the entry evicted from the TLB and written to the EMTLB).

In some implementations, physical address translations are written to the EMTLB at the same time they are written to the TLB following a page table walk and TLB evictions are not written to the EMTLB (e.g., on the assumption that the physical address translation was already written to the EMTLB when it was written to the TLB). In an example of one such replacement algorithm, the current translation is stored in the TLB, and if the TLB is full, an entry is evicted from the TLB to make space for the new translation. The entry chosen for eviction depends upon the replacement algorithm. The chosen entry is evicted from the TLB, and the evicted entry is written to the EMTLB. If the EMTLB is full, an entry is evicted from the EMTLB to make room for the entry evicted from the TLB. Because the EMTLB is the lowest level of the TLB structure, any translation evicted from the EMTLB will no longer be cached. In some implementations a least recently used (LRU) entry is chosen for eviction from the EMTLB. In some implementations this differs from the replacement algorithm for the TLB, where on-chip memory is not large enough to implement hardware to track an LRU entry. Various kinds of replacement algorithms are possible for TLB and EMTLB replacement, and any suitable replacement algorithm can be used.

On the condition 460 that the EMTLB lookup misses, the MMU performs a page table walk (e.g., using PTW 320 as shown and described with respect to FIG. 3) in step 470. The corresponding physical address retrieved by the page table walk is returned to the client in step 440.

In some implementations, the physical address translation is stored in the TLB at this stage. In some implementations, the replacement state of the TLB is updated to reflect the lookup hit (i.e., to note that the physical address translation was the most recently used in the TLB). In some implementations, if the TLB is full before the physical address translation is stored, a replacement algorithm is also executed to identify an entry for eviction to make room for the physical address translation. In some implementations, if an entry is evicted from the TLB to make room for the physical address translation, the evicted entry is written to the EMTLB, and a corresponding replacement algorithm is run on the EMTLB if necessary (i.e., to determine which entry to evict from the EMTLB, if necessary, and to update the recency of the entry evicted from the TLB and written to the EMTLB). In some implementations, physical address translations are written to the EMTLB at the same time they are written to the TLB following a page table walk and TLB evictions are not written to the EMTLB, e.g., on the assumption that the physical address translation was already written to the EMTLB when it was written to the TLB.

Procedure 400 illustrates a scenario where a page table walk, and its potentially expensive overhead, are avoided in cases where a translation can be found in an EMTLB. However, in scenarios where both the TLB and EMTLB lookups miss, the overhead of the page table walk is still incurred, and is added to the overhead of the EMTLB lookup. This can occur in various scenarios, such as early in execution, or following a TLB/EMTLB flush, where few translations have been cached. In some cases, implementation of an EMTLB yields reduced performance during such scenarios.

Figure 5:
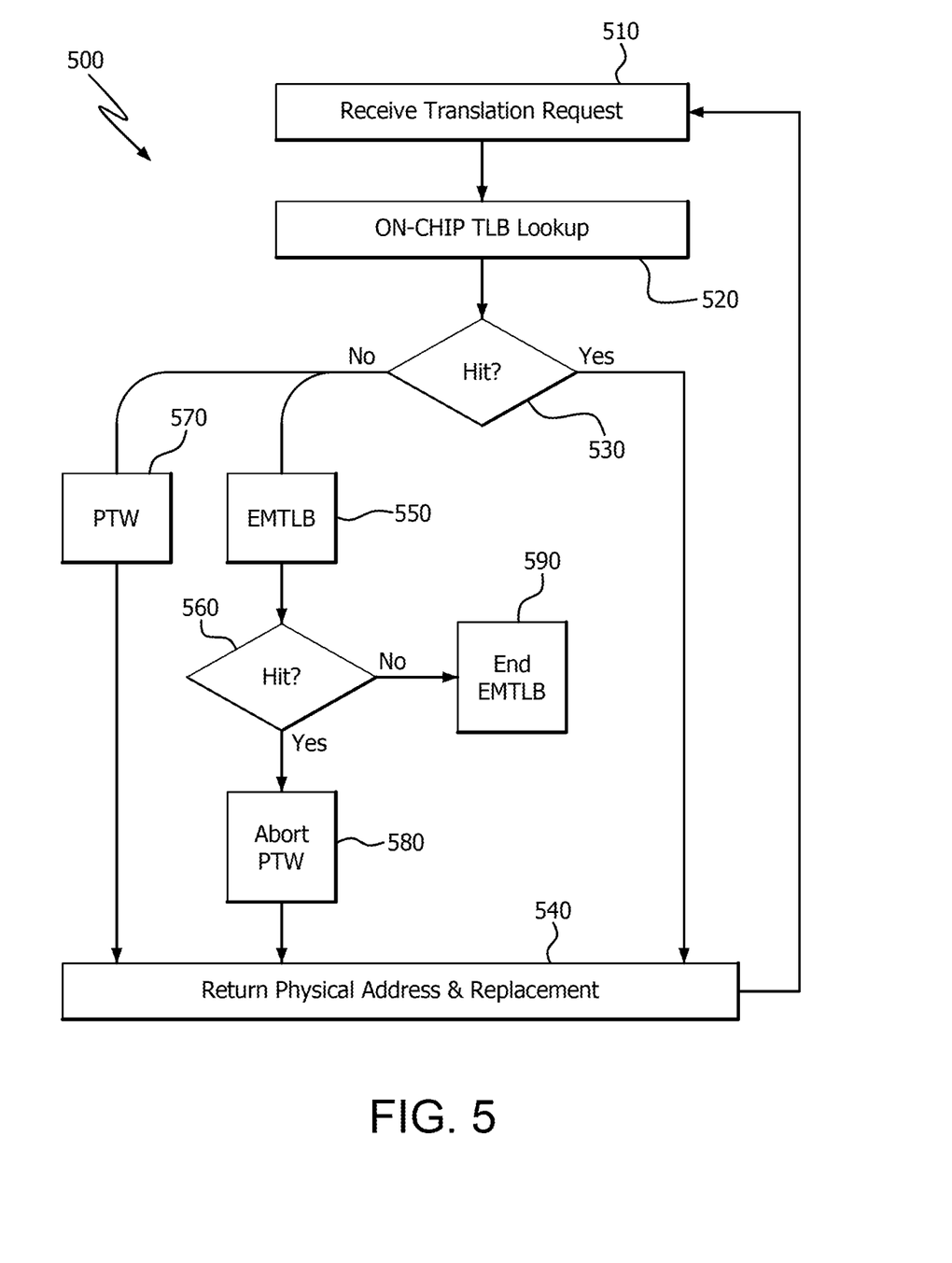
FIG. 5 is a flow diagram illustrating another example procedure for performing a virtual-to-physical address translation.

FIG. 5 is a flow diagram illustrating an example procedure 500 for performing a virtual-to-physical address translation. In some implementations, procedure 500 is usable with system 300 as shown and described with respect to FIG. 3.

In step 510, an MMU (e.g., MMU 320 as shown and described with respect to FIG. 3) receives a request to translate a virtual address from a client. The request includes (or indicates) a virtual address for translation to a physical address in memory. If the MMU receives such a request, it performs a lookup in its TLB (e.g., TLB 330 as shown and described with respect to FIG. 3, a TLB that is part of the MMU 320, or which is in the same core or on the same chip as the MMU, etc.) in step 420. In various implementations, this TLB ("TLB" "MMU TLB" or "on-chip TLB") includes one cache level, or more than one cache level.

On a condition 530 that the TLB lookup hits—in other words, a translation for the virtual address included in or indicated by the request is found in the MMU TLB, the corresponding physical address stored in the TLB is returned to the client in step 540. In some implementations, a replacement algorithm for the TLB is executed at this time to update the cache; for example, in cases where the translation was found in a lower level of the MMU TLB. In some examples, the algorithm updates the replacement state of the TLB but does not alter the translation information.

On the condition 530 that the TLB lookup misses—in other words, a translation for the virtual address included in or indicated by the request is not found in the MMU TLB, the MMU performs a lookup in an EMTLB (e.g., EMTLB 360 as shown and described with respect to FIG. 3) in step 550. In addition to beginning the EMTLB lookup in step 550, the MMU also begins a page table walk in step 570 (e.g., using PTW 320 as shown and described with respect to FIG. 3)

While the page table walk progresses during step 570, it is determined whether the EMTLB lookup of step 550 results in a hit. On a condition 560 that the EMTLB lookup hits, the page table walk is aborted in step 580 and the corresponding physical address translation stored in the EMTLB is returned to the client in step 540. In some implementations, the replacement state of the EMTLB is updated to reflect the lookup hit (i.e., to note that the physical address translation was the most recently used in the EMTLB).

On the condition 560 that the EMTLB lookup misses, the EMTLB lookup ends in step 590, and the page table walk continues in step 570. The corresponding physical address retrieved by the page table walk is returned to the client in step 540.

In some implementations, the physical address translation is stored in the TLB at step 540. In some implementations, the replacement state of the TLB is updated to reflect the lookup hit (i.e., to note that the physical address translation was the most recently used in the TLB). In some implementations, if the TLB is full before the physical address translation is stored, a replacement algorithm is also executed to identify an entry for eviction to make room for the physical address translation. In some implementations, if an entry is evicted from the TLB to make room for the physical address translation, the evicted entry is written to the EMTLB, and a corresponding replacement algorithm is run on the EMTLB if necessary. (i.e., to determine which entry to evict from the EMTLB, if necessary, and to update the recency of the entry evicted from the TLB and written to the EMTLB). In some implementations, physical address translations are written to the EMTLB at the same time they are written to the TLB following a page table walk and TLB evictions are not written to the EMTLB, e.g., on the assumption that the physical address translation was already written to the EMTLB when it was written to the TLB.

Procedure 500 illustrates a scenario where, as in procedure 400, a page table walk, and its potentially expensive overhead, are avoided in cases where a translation can be found in an EMTLB. In cases where both the TLB and EMTLB lookups miss, the overhead of the page table walk is still incurred, but this overhead is not added to the overhead of the EMTLB lookup because the EMTLB lookup executes in parallel with the page table walk. In some cases, implementation of an EMTLB which operates in parallel (e.g., simultaneously or concurrently) with a page table walk does not reduce performance significantly during such scenarios. For example, in some implementations, page table walk latency is impacted only by a single EMTLB memory access due to the parallel EMTLB lookup.

Figure 6:
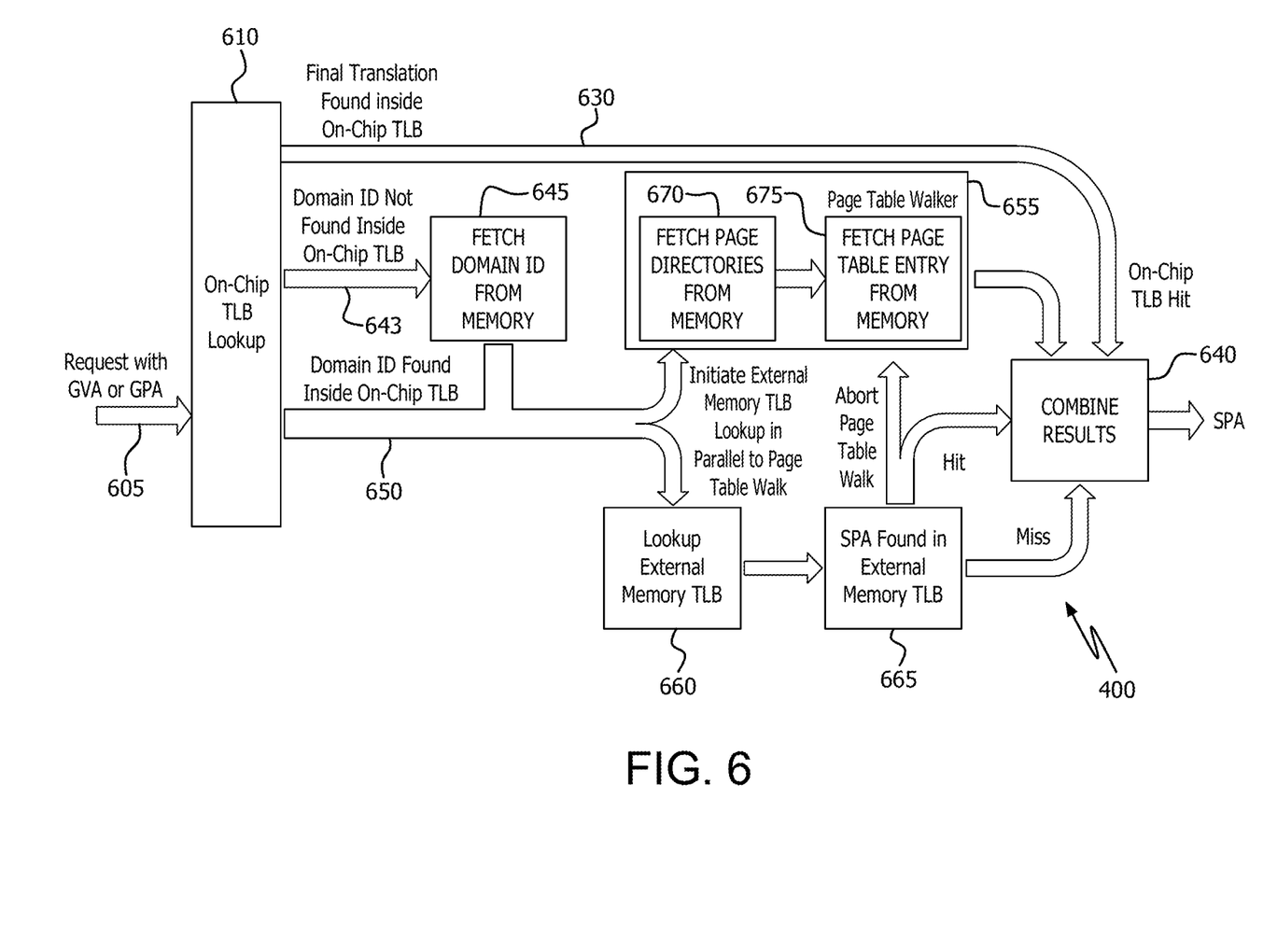
FIG. 6 is a flow diagram illustrating another example procedure for performing a virtual-to-physical address translation.

FIG. 6 is a flow diagram illustrating an example procedure 600 for performing a virtual-to-physical address translation. In some implementations, procedure 600 is usable with system 300 as shown and described with respect to FIG. 3.

Procedure 600 includes details relating to multi-layer translation of virtual addresses in a virtualized system. In the virtualized system, a virtual machine (VM) is allocated a particular virtual address space corresponding to physical memory. In this example, the virtual address space addresses allocated to the VM are referred to as guest physical addresses (GPA), and the physical memory addresses are referred to as system physical addresses (SPA). The address space for the VM is also assigned a domain identity (Domain ID). Translation of a GPA to retrieve an SPA is referred to as a host layer translation.

Each application executing within the VM is allocated a virtual address space corresponding to the GPAs. In this example, the virtual address space addresses allocated to the application are referred to as guest virtual addresses (GVA). Each application is also assigned a process identity (PASID). Translation of a GVA to retrieve a corresponding GPA is referred to as a guest layer translation. Accordingly, a complete GVA to SPA translation can be described as being made up of two translations; i.e., GVA to GPA (guest layer), and GPA to SPA (host layer). This is an example of a nested page table walk. In this example, the translation from the GVA to GPA may be referred to as an intermediate translation. It is noted that in some implementations, more than two levels of nesting may be used, where complete translations may be made up of three or more translations, including two or more intermediate translations.

In procedure 600, the MMU TLB stores device table entries, partial GVA to SPA translations, and final GPA to SPA translations. A Domain ID is stored in the MMU TLB for each entry type. The EMTLB is tagged by GVA or GPA, Domain ID, and PASID.

In step 605, an MMU (e.g., MMU 320) receives a request which includes a virtual address for translation to a physical address. In this case, the request includes a GVA or GPA ("virtual address") for translation to a SPA.

On a condition 630 that the TLB lookup 610 hits (i.e., a translation for the virtual address is included in or indicated by the request is found in the MMU TLB) the corresponding SPA stored in the MMU TLB is returned to the client in step 640. In some implementations, a replacement algorithm for the MMU TLB is executed at this time to update the cache; for example, in cases where the translation was found in a lower level of the MMU TLB.

If the TLB lookup 610 misses (i.e., an SPA corresponding to the virtual address is included in or indicated by the request is not found in the MMU TLB), it is determined whether a Domain ID of the requested virtual address is stored in the MMU TLB. On a condition 643 that the Domain ID is not stored in the MMU TLB, the Domain ID of the requested virtual address is fetched from memory in step 645; otherwise it is retrieved from the MMU TLB in step 650. In either case, both a page table walk and EMTLB lookup are executed based on the virtual address and Domain ID in steps 655 and 660 respectively.

On a condition 665 that the EMTLB hits, the page table walk is aborted and the corresponding SPA is returned to the client in step 640. In some implementations, the replacement state of the EMTLB is updated to reflect the lookup hit (i.e., to note that the physical address translation was the most recently used in the EMTLB).

On the condition 665 that the EMTLB lookup misses, the EMTLB lookup simply ends, and the page table walk continues in step 655.

The page table walk of step 655 takes longer than the EMTLB lookup of step 660 in this example, and includes fetching page directories from memory in step 670 and using the fetched page directories to fetch the page table entry corresponding to the virtual address in step 675. From the fetched page table entry, the MMU returns the corresponding SPA to the client in step 640.

In some implementations, the translation is stored in the TLB at step 640. In some implementations, the replacement state of the TLB is updated to reflect the lookup hit (i.e., to note that the physical address translation was the most recently used in the TLB). In some implementations, if the TLB is full before the translation is stored, a replacement algorithm is also executed to identify an entry for eviction to make room for the translation. In some implementations, if an entry is evicted from the TLB to make room for the translation, the evicted entry is written to the EMTLB, and a corresponding replacement algorithm is run on the EMTLB if necessary (i.e., to determine which entry to evict from the EMTLB, if necessary, and to update the recency of the entry evicted from the TLB and written to the EMTLB). In some implementations, translations are written to the EMTLB at the same time they are written to the TLB following a page table walk and TLB evictions are not written to the EMTLB, e.g., on the assumption that the translation was already written to the EMTLB when it was written to the TLB.

Procedure 600 illustrates a scenario where, like in procedure 400, a page table walk (and its potentially expensive overhead) is avoided in cases where a translation can be found in an EMTLB. In scenarios where both the TLB and EMTLB lookups miss, the overhead of the page table walk is still incurred, but this overhead is not added to the overhead of the EMTLB lookup because the EMTLB lookup executes in parallel with the page table walk. In some cases, implementation of an EMTLB which operates in parallel with a page table walk does not reduce performance during such scenarios.

In some circumstances it is necessary to invalidate certain contents of a TLB. Such circumstances occur, for example, where software makes changes to the page table in memory (e.g., for a page-table entry, changing the valid bit value, changing the address, or changing attributes, such as read-write to read-only). Software may make changes to the page table in memory, for example, where memory is deallocated to free it for allocation to a new client. An example case where memory is deallocated is where an application or device driver has finished using memory allocated for its use, and releases it.

In such cases contents of the TLB are either marked as not valid, or cleared or "zeroed out" in different implementations. In implementations which include an EMTLB, certain contents of the EMTLB also need to be invalidated. However due to its large size and access latency, it may not be feasible to scan each entry of the EMTLB to identify the invalidation targets. Accordingly, EMTLB entries can include a Domain ID in order to facilitate domain-based invalidations. For example, if a range of GPAs corresponding to a particular VM are to be invalidated, only those entries in the EMTLB corresponding to the Domain ID of that VM need to be scanned for invalidation.

Several different options are possible for invalidating EMTLB entries. Some implementations include deferred invalidation. A deferred invalidation can be implemented as a filter applied prior to EMTLB accesses. The filter contains information about invalidations that have been buffered for processing but have not completed updating the EMTLB memory itself. If invalidations are received by the EMTLB control logic (e.g., from software via the MMU), they are stored in the filter (if there is space) and are treated by the MMU as "complete" even before the EMTLB memory is checked or possibly updated In treating the invalidations as complete, the MMU signals software to indicate that the invalidation has completed. Software may accordingly modify the invalidated part of the page table, as prior copies of the translations have been removed from the TLBs/EMTLBs. In an example operation, software executing on the system sends a signal to the MMU (e.g., via other components) invalidating a particular page translation. After the signal has been received by the MMU (e.g., is acknowledged in a suitable way), the software treats the invalidation as complete. This is because after this point the MMU has either completed the invalidation or has stored the invalidation in a buffer (i.e., deferred invalidation) such that the invalidated translation will not be accessible even if it has not yet been marked invalid in the EMTLBs.

If a translation request to the EMTLB control logic for a translation lookup hits in the filter, the request is treated as an EMTLB miss, even if the translation is in fact still stored in the EMTLB memory. This is because any related entries in the EMTLB memory were intended to be invalidated even if they are still physically encoded within the EMTLB memory (i.e., the invalidate buffered in the filter has not yet updated the EMTLB memory). In some implementations, a state machine searches the EMTLB memory for entries that match one of the buffered invalidations within the filter. In some implementations, this occurs in parallel with waiting for and receiving translation requests. If any of the entries buffered in the filter matches the invalidation criteria, the corresponding entries are evicted from the EMTLB memory.

Once all entries that potentially match an invalidation have been scanned, the processed invalidation is removed from the filter.

If the filter is full, the invalidation cannot immediately complete. In this case, in some implementations, the invalidation either waits for space to free up within the filter, or a separate scanning logic (e.g., within the EMTLB logic) scans the EMTLB memory for entries that match the invalidation criteria and evicts them. If the scanning completes, the invalidation is considered complete from the perspective of the EMTLB.

Some implementations include a "memory-write/clear" scheme for invalidation. In the memory-write/clear scheme, scanning logic does not read the contents of the EMTLB memory to determine which entries to invalidate. Rather, the scanning logic simply writes the EMTLB memory such that all potential entries that match the invalidation criteria are made invalid. This scheme may require one or multiple memory writes.

Some implementations include a "read-modify-write" scheme for invalidation. In the read-modify-write scheme, scanning logic reads potential entries of the EMTLB to determine entries that match the invalidation criteria, and only invalidates entries that match the criteria by overwriting them.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for virtual address translation, the method comprising:
   receiving, by a memory management unit (MMU), a request to translate a virtual memory address to a physical memory address;
   searching, by the MMU, based on the virtual memory address, a translation lookaside buffer (TLB), for a translation to the physical memory address;
   in response to the translation not being found in the TLB and a domain identification being found in the TLB, wherein the domain identification identifies an address space for a virtual machine:
     fetching the domain identification from the TLB;
     searching, by the MMU, an external memory translation lookaside buffer (EMTLB) for the translation;
     performing, by a page table walker (PTW), a page table walk to retrieve the translation from a page table;
     if the translation is found in the EMTLB, aborting the page table walk and returning the physical memory address; and
     if the translation is not found in the EMTLB, returning the physical memory address based on the page table walk.

2. The method of claim 1, wherein the EMTLB comprises a region of memory that is external to the MMU.

3. The method of claim 1, wherein the EMTLB is searched for the translation in parallel with the page table walk.

4. The method of claim 1, wherein a replacement state of the EMTLB is stored in a region of memory that is separate from a processor on which the MMU is implemented.

5. The method of claim 1, wherein entries in the EMTLB include data, tag, and replacement information.

6. The method of claim 1, further comprising:
   transmitting, to the EMTLB, a request to invalidate an EMTLB entry, wherein the request is buffered in an invalidation filter of the EMTLB; and
   receiving an acknowledgement that the invalidation is complete, wherein the acknowledgement indicates that the request to invalidate is buffered in the invalidation filter.

7. The method of claim 1, further comprising:
   if the translation is not found in the TLB and if the translation is found in the EMTLB, storing the translation in the TLB.

8. The method of claim 1, further comprising:
   if the translation is not found in the TLB and if the TLB is full:
   evicting a translation entry from the TLB; and
   writing the evicted translation entry to the EMTLB.

9. The method of claim 1, further comprising:
   if the translation is not found in the TLB and not found in the EMTLB:
   writing the translation, based on the page table walk, to both the TLB and the EMTLB.

10. The method of claim 1, wherein the MMU searches, based on the virtual memory address, for the translation to the physical memory address, by:
    searching for a translation from the virtual memory address to an intermediate virtual memory address, and
    searching for a translation from the intermediate virtual memory address to the physical memory address.

11. A memory management unit (MMU) for virtual address translation, the MMU comprising:
    circuitry configured to receive a request to translate a virtual memory address to a physical memory address;
    circuitry configured to search, based on the virtual memory address, a translation lookaside buffer (TLB), for a translation to the physical memory address;
    circuitry configured to search an external memory translation lookaside buffer (EMTLB) for the translation and to perform a page table walk using a page table walker (PTW) to retrieve the translation, if the translation is not found in the TLB;

circuitry configured to fetch a domain identification from the TLB if the domain identification is found in the TLB and the translation is not found in the TLB, wherein the domain identification identifies an address space for a virtual machine;

circuitry configured to abort the page table walk and return the physical memory address if the physical memory address is found in the EMTLB; and circuitry configured to return the physical memory address based on the page table walk if the translation is not found in the EMTLB.

12. The MMU of claim 11, wherein the EMTLB comprises a region of memory that is external to the MMU.

13. The MMU of claim 11, wherein the EMTLB is searched for the translation in parallel with the page table walk.

14. The MMU of claim 11, wherein a replacement state of the EMTLB is stored in a region of memory that is separate from a processor on which the MMU is implemented.

15. The MMU of claim 11, wherein translations are written to the EMTLB in pseudo-random entry locations.

16. The MMU of claim 11, wherein entries in the EMTLB include data, tag, and replacement information, and the data, tag, and replacement information can be accessed from the EMTLB by a single memory access.

17. The MMU of claim 11, further comprising:
circuitry configured to transmit, to the EMTLB, a request to invalidate an EMTLB entry, wherein the request is buffered in an invalidation filter of the EMTLB; and
circuitry configured to receive, from the EMTLB, acknowledgement that the invalidation is complete, wherein the acknowledgement indicates that the request to invalidate is buffered in the invalidation filter.

18. The MMU of claim 11, further comprising:
circuitry configured to store the translation in the TLB if the translation is not found in the TLB and if the translation is found in the EMTLB.

19. The MMU of claim 11, further comprising:
circuitry configured to, if the translation is not found in the TLB and if the TLB is full:
evict a translation entry from the TLB; and
write the evicted translation entry to the EMTLB.

20. The MMU of claim 11, further comprising:
circuitry configured to write the translation, based on the page table walk, to both the TLB and the EMTLB, if the translation is not found in the TLB and not found in the EMTLB.

21. The MMU of claim 11, further comprising circuitry configured to search, based on the virtual memory address, for the translation to the physical memory address, by:
searching for a translation from the virtual memory address to an intermediate virtual memory address, and searching for a translation from the intermediate virtual memory address to the physical memory address.

22. A computing device comprising:
a processor and a memory in communication with the processor;
the processor comprising a memory management unit (MMU) for virtual address translation, the MMU comprising a translation lookaside buffer (TLB) and a page table walker (PTW);
the memory comprising an external memory translation lookaside buffer (EMTLB);

the MMU further comprising circuitry configured to receive a request to translate a virtual memory address to a physical memory address;

the MMU further comprising circuitry configured to search the TLB based on the virtual memory address for a translation to the physical memory address;

the MMU further comprising circuitry configured to search the EMTLB for the translation and to perform a page table walk using the PTW to retrieve the translation, if the translation is not found in the TLB;

the MMU further comprising circuitry configured to fetch a domain identification from the TLB if the domain identification is found in the TLB and the translation is not found in the TLB, wherein the domain identification identifies an address space for a virtual machine;

the MMU further comprising circuitry configured to abort the page table walk and return the physical memory address if the translation is found in the EMTLB; and the MMU further comprising circuitry configured to return the physical memory address based on the page table walk if the translation is not found in the TLB and not found in the EMTLB.

23. The computing device of claim 22, wherein the EMTLB comprises a region of memory that is external to the MMU.

24. The computing device of claim 22, wherein the EMTLB is searched for the translation in parallel with the page table walk.

25. The computing device of claim 22, wherein a replacement state of the EMTLB is stored in a region of memory that is separate from a processor on which the MMU is implemented.

26. The computing device of claim 22, wherein translations are written to the EMTLB in pseudo-random entry locations.

27. The computing device of claim 22, wherein entries in the EMTLB include data, tag, and replacement information, and the data, tag, and replacement information can be accessed from the EMTLB by a single memory access.

28. The computing device of claim 22, further comprising:
circuitry configured to transmit, to the EMTLB, a request to invalidate an EMTLB entry, wherein the request is buffered in an invalidation filter of the EMTLB; and
circuitry configured to receive, from the EMTLB, an acknowledgement that the invalidation is complete, wherein the acknowledgement indicates that the request to invalidate is buffered in the invalidation filter.

29. The computing device of claim 22, further comprising:
circuitry configured to store the translation in the TLB if the translation is not found in the TLB and if the translation is found in the EMTLB.

30. The computing device of claim 22, further comprising:
circuitry configured to, if the translation is not found in the TLB and if the TLB is full:
evict a translation entry from the TLB; and
write the evicted translation entry to the EMTLB.

31. The computing device of claim 22, further comprising:
circuitry configured to write the translation, based on the page table walk, to both the TLB and the EMTLB, if the translation is not found in the TLB and not found in the EMTLB.

32. The computing device of claim 22, further comprising circuitry configured to search, based on the virtual memory address, for the translation to the physical memory address, by:

searching for a translation from the virtual memory address to an intermediate virtual memory address, and searching for a translation from the intermediate virtual memory address to the physical memory address.

\* \* \* \* \*